United States Patent
Setsuda et al.

(10) Patent No.: US 8,973,961 B1
(45) Date of Patent: Mar. 10, 2015

(54) VEHICLE TRIM PANEL

(71) Applicant: Nissan North America, Inc., Franklin, TN (US)

(72) Inventors: Roy Setsuda, Walled Lake, MI (US); James Zucal, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/224,244

(22) Filed: Mar. 25, 2014

(51) Int. Cl.
*B62D 39/00* (2006.01)
*B60R 13/02* (2006.01)

(52) U.S. Cl.
CPC ................................. *B60R 13/0206* (2013.01)
USPC ............................. 296/1.08; 52/716.5; 428/31

(58) Field of Classification Search
USPC .............................. 296/1.08; 52/716.5; 428/31
See application file for complete search history.

(56) References Cited

U.S. PATENT DOCUMENTS

| | | | |
|---|---|---|---|
| 6,213,537 B1 | 4/2001 | Butz et al. | |
| 7,992,915 B2 | 8/2011 | Kwolek | |
| 8,011,709 B2 | 9/2011 | Senakiewich, II et al. | |
| 8,262,154 B2 | 9/2012 | Garnett et al. | |
| 8,276,961 B2 | 10/2012 | Kwolek | |
| 8,291,553 B2 | 10/2012 | Moberg | |
| 2009/0058118 A1* | 3/2009 | Hein et al. | 296/1.08 |
| 2011/0221170 A1* | 9/2011 | Thurston et al. | 280/728.1 |
| 2013/0057009 A1* | 3/2013 | Turicik et al. | 296/1.08 |
| 2013/0234463 A1 | 9/2013 | Vasko et al. | |
| 2013/0234474 A1* | 9/2013 | Coakley et al. | 296/210 |
| 2013/0249230 A1 | 9/2013 | Gillay et al. | |
| 2013/0278001 A1 | 10/2013 | Zimmerman et al. | |

OTHER PUBLICATIONS

Jeep Grand Cherokee; 13. Cluster Bezel 2005-2010.

* cited by examiner

*Primary Examiner* — Lori L Lyjak
(74) *Attorney, Agent, or Firm* — Global IP Counselors, LLP

(57) ABSTRACT

A vehicle trim panel includes a main body and a temporary cover. The main body has a finished surface and an attachment surface with a peripheral edge that encircles the main body. The peripheral edge is defined between the finished surface and the attachment surface. The attachment surface includes a plurality of attachment projections that protrude from the attachment surface. The plurality of attachment projections are dimensioned and positioned to fixedly attach the main body to a vehicle body member. The attachment surface also includes a plurality of retention hooks protruding from the attachment surface. The temporary cover covers the finished surface and includes a plurality of holes fitted to corresponding ones of the plurality of retention hooks.

20 Claims, 8 Drawing Sheets

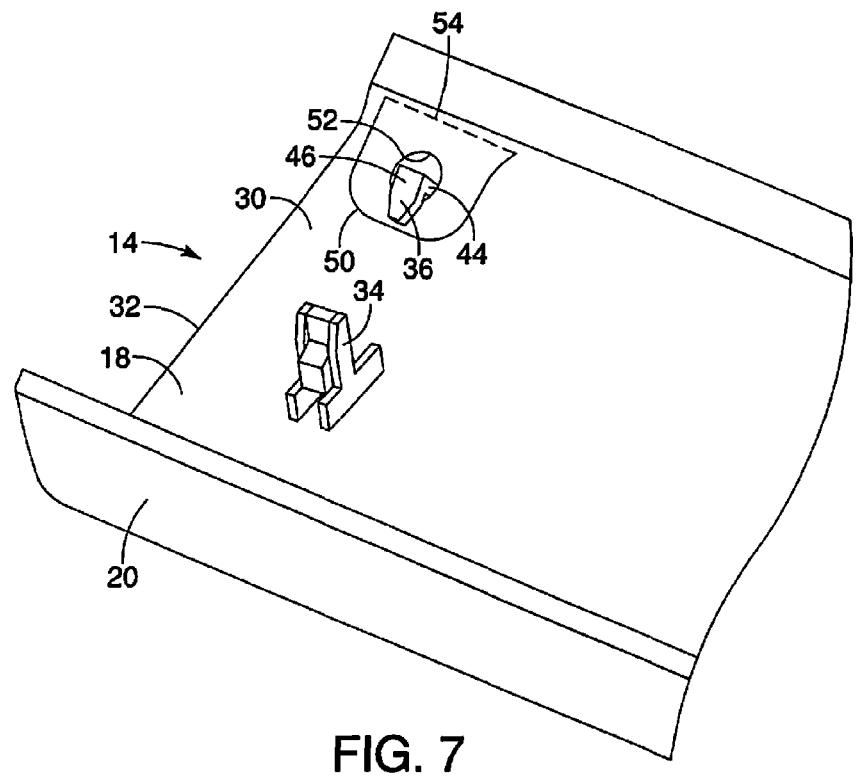
FIG. 7
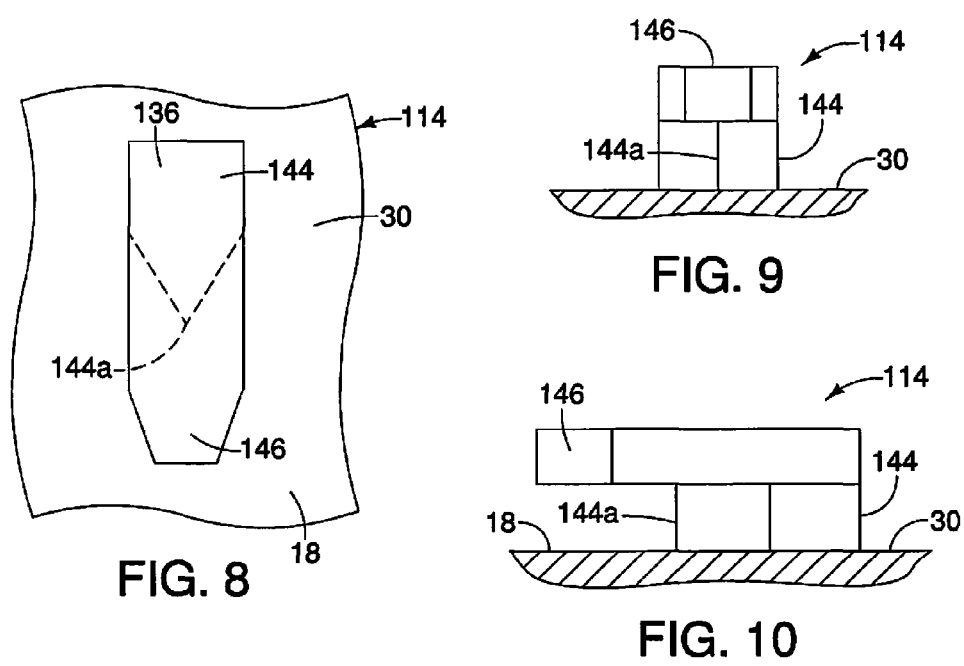
FIG. 8
FIG. 9
FIG. 10

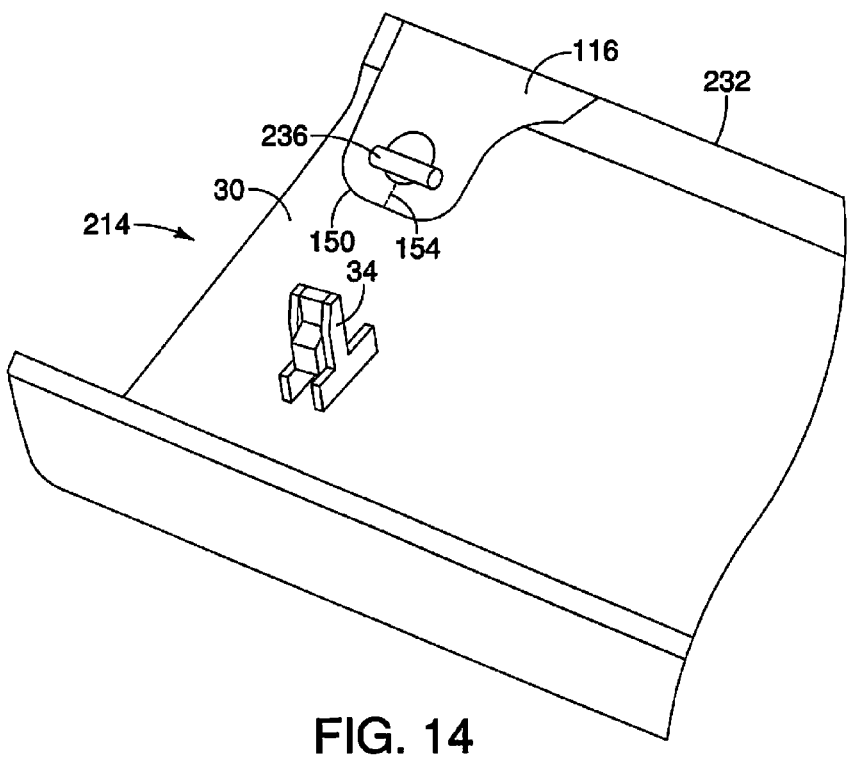
FIG. 14
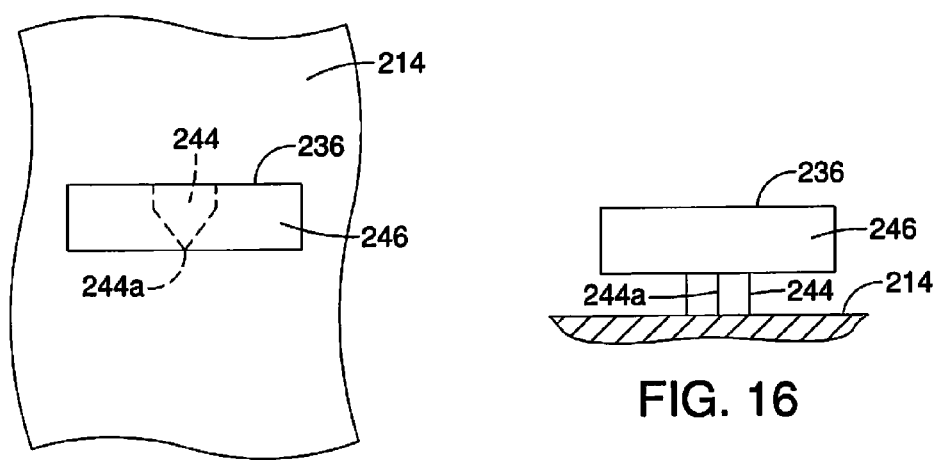
FIG. 15
FIG. 16

VEHICLE TRIM PANEL

BACKGROUND

1. Field of the Invention

The present invention generally relates to a vehicle trim panel. More specifically, the present invention relates to a vehicle trim panel that includes attachment projections and retention hooks that retain a temporary cover over a finished surface of the vehicle trim panel.

2. Background Information

A vehicle trim panel is sometimes covered with a temporary cover that protects a finished surface of the trim panel during assembly, as well as during handling and shipping of the vehicle to a point of sale. The temporary cover is usually removed by a technician at the point of sale just prior to or just after the sale of the vehicle.

The temporary cover is often attached to the vehicle trim panel by a removable adhesive layer or adhesive tape. Sometimes the temporary cover is difficult to remove or sections of the temporary cover tear off and are difficult to remove.

SUMMARY

One object of the disclosure is to provide a vehicle trim panel with retention hooks that retain a temporary cover.

Another object of the disclosure is to provide a temporary cover with perforations that make for more reliable removal of the temporary cover from a trim panel.

In view of the state of the known technology, one aspect of the disclosure includes a vehicle trim panel having a main body and a temporary cover. The main body has a finished surface and an attachment surface with a peripheral edge that encircles the main body. The peripheral edge is defined between the finished surface and the attachment surface. The attachment surface includes a plurality of attachment projections that protrude from the attachment surface. The plurality of attachment projections are dimensioned and positioned to fixedly attach the main body to a vehicle body member. The attachment surface also includes a plurality of retention hooks protruding from the attachment surface. The temporary cover covers the finished surface and includes a plurality of holes fitted to corresponding ones of the plurality of retention hooks.

BRIEF DESCRIPTION OF THE DRAWINGS

Referring now to the attached drawings which form a part of this original disclosure:

FIG. 7 is a perspective view of the portion of the trim panel similar to FIG. 5, showing the retention hook with the temporary cover removed and torn away leaving the tab still attached to the retention hook of the trim panel in accordance with the first embodiment;

FIG. 8 is a plan view of a portion of a trim panel showing a retention hook in accordance with a second embodiment;

FIG. 9 is an end view of the portion of the trim panel showing an edge of the retention hook in accordance with the second embodiment;

FIG. 10 is a side view of the portion of the trim panel showing an edge of the retention hook in accordance with the second embodiment;

FIG. 14 is a perspective view of a portion of a trim panel showing a retention hook with the temporary cover attached to the retention hook of the trim panel in accordance with a third embodiment;

FIG. 15 is a plan view of the portion of the trim panel showing the retention hook in accordance with the third embodiment;

FIG. 16 is an end view of the portion of the trim panel showing an edge of the retention hook in accordance with the third embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
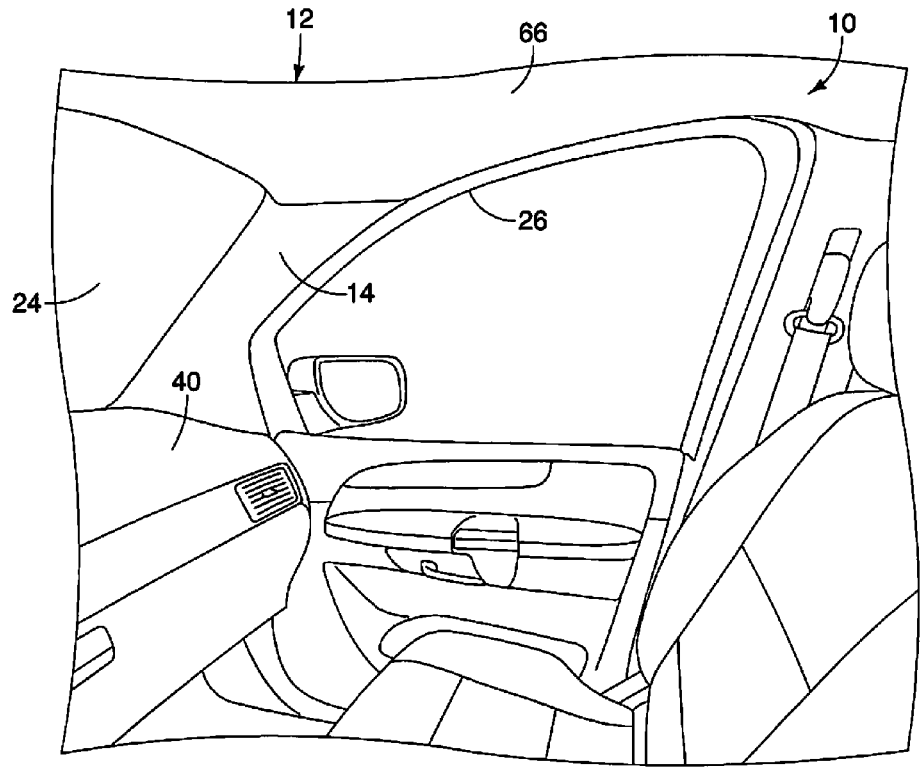
FIG. 1 is a perspective view of an interior portion of a passenger compartment of a vehicle showing a trim panel installed within the vehicle in accordance with a first embodiment.
Figure 3:
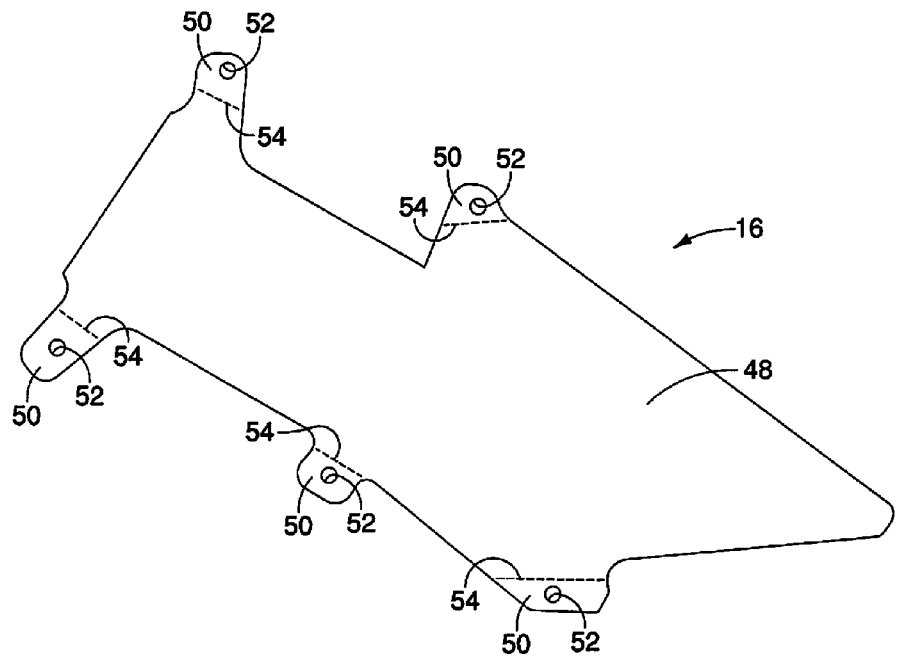
FIG. 3 is a plan view of the temporary cover shown removed from the trim panel in accordance with the first embodiment.

Referring initially to FIG. 1, a passenger compartment 10 of a vehicle 12 having a trim panel 14 with a temporary cover 16 is illustrated in accordance with a first embodiment. As is described in greater detail below, the trim panel 14 has a main body 18 with a finished surface 20 that is that is protected by the temporary cover 16 (FIG. 3). The temporary cover 16 is typically installed to the trim panel 14 just after the manufacturing of the trim panel 14. The temporary cover 16 remains on the trim panel 14 when the trim panel 14 is shipped to a vehicle manufacturing plant, and during installation of the trim panel 14 to the vehicle 10. Thereafter, the temporary cover 16 is removed from the trim panel 14.

Figure 2:
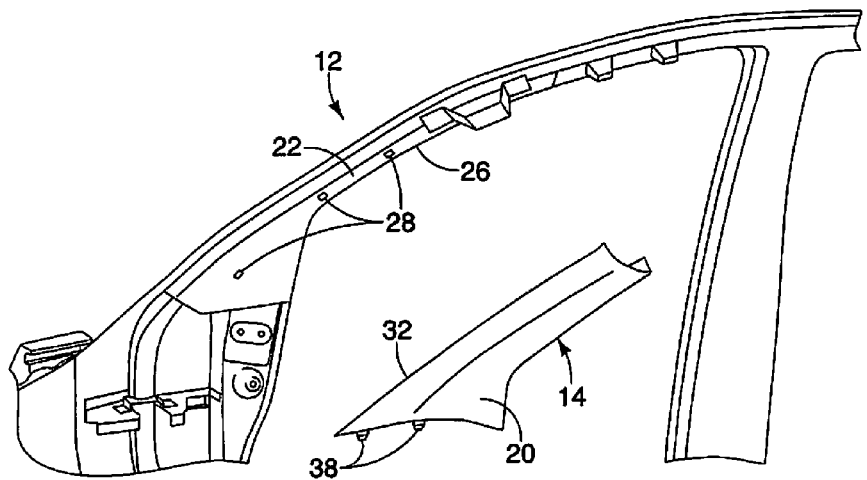
FIG. 2 is an exploded side view of the portion of the passenger compartment of FIG. 1, showing the trim panel prior to installation within the vehicle, the trim panel having a temporary cover fitted thereto in accordance with the first embodiment.

A brief description of portions of the vehicle 12 is now provided with specific reference to FIGS. 1 and 2. The passenger compartment 10 is defined by various vehicle body structures such as, for example, an A-pillar 22. The trim panel 14 is configured to attach to the A-pillar 22 within the passenger compartment 10. However, it should be understood that the trim panel 14 can be any of a variety of trim panels installed to various corresponding vehicle body structures within the vehicle 12, at various locations within the vehicle 12. The trim panel 14 attaching to the A-pillar 22 is just one example of a trim panel that includes temporary cover attachment structures and a temporary cover, as described hereinbelow.

The A-pillar 22 is a structure that extends upward between a windshield 24 and a front door opening 26, as shown in FIGS. 1 and 2. The A-pillar 22 includes a plurality of attachment apertures 28, as shown in FIG. 2.

The main body 18 of the trim panel 14 includes the finished surface 20 (FIGS. 1 and 2), an attachment surface 30 and a peripheral edge 32 defined between the finished surface 20 and the attachment surface 32. The peripheral edge 32 encircles the main body 18 and is defined between the finished surface 20 and the attachment surface 30. The finished surface 20 can include a decorative contour and/or texture that is formed directly on the finished surface 20. Alternatively, the main body 18 of the trim panel 14 can include a separate decorative layer, such as a textile, leather, simulated leather, wood, or simulated wood, or other decorative appearance that defines the finished surface 20.

Since the finished surface 20 is intended to provide an attractive decorative appearance, the finished surface 20 is covered by the temporary cover 16 for protection almost immediately after manufacturing, but before installation onto the corresponding structure of the vehicle 12. The temporary cover 16 is intended to remain on the trim panel 14 during shipping and handling, prior to the installation process, during the vehicle manufacturing process, and after trim panel installation process. Still further, the temporary cover 16 can remain on the trim panel 14 until the vehicle 12 is sold. The temporary cover 16 is shown in an uninstalled state in FIG. 3, and is described in greater detail below.

Figure 4:
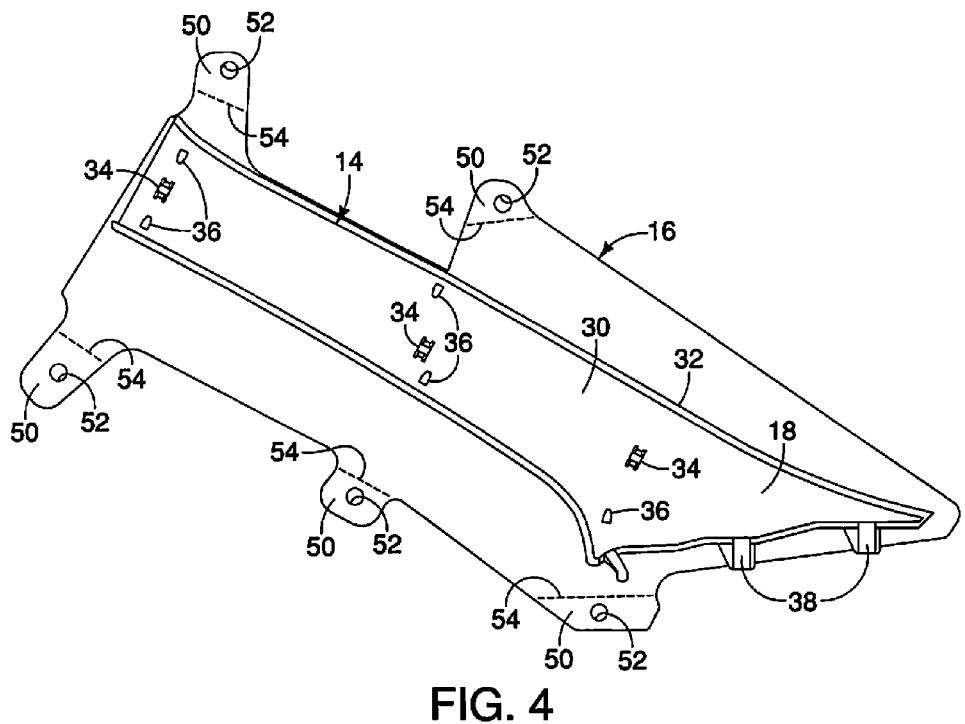
FIG. 4 is a plan view of the temporary cover being installed to a plurality of retention hooks formed on an attachment surface of the trim panel in accordance with the first embodiment.

The attachment surface 30 of the trim panel 14 is on a side of the trim panel 14 opposite the finished surface 20. As shown in FIG. 4, the attachment surface 30 includes a plurality of attachment projections 34 and a plurality of retention hooks 36. The attachment projections 34 protrude from the attachment surface 30. The attachment projections 34 are dimensioned and positioned to fixedly attach the main body 18 of the trim panel 16 to the A-pillar 22 (a vehicle body member). The attachment projections 34 are, for example, snap-fitting projections that are positioned relative to one another such that they align with and fit into the apertures 28 of the A-pillar 22. Once inserted and snap-fitted into the apertures 28, the attachment projections 34 retain the trim panel 14 to the A-pillar 22.

The trim panel 14 can also be provided with additional structures that retain the trim panel 14 in position. For example, the trim panel 14 can also include projections 38 that extend from a lower portion of the peripheral edge 32 of the main body 18 and are inserted into apertures (not shown) in an instrument panel 40 (FIG. 1) of the vehicle 12. Further, the attachment projections 34 and projections 38 can alternatively be any of a variety of attachment structures that retain the trim panel 14 to a corresponding vehicle structure of the vehicle 12. For example, the attachment projections 34 and/or the projection 38 can be mechanical fasteners, such as screws or rivets.

Figure 5:
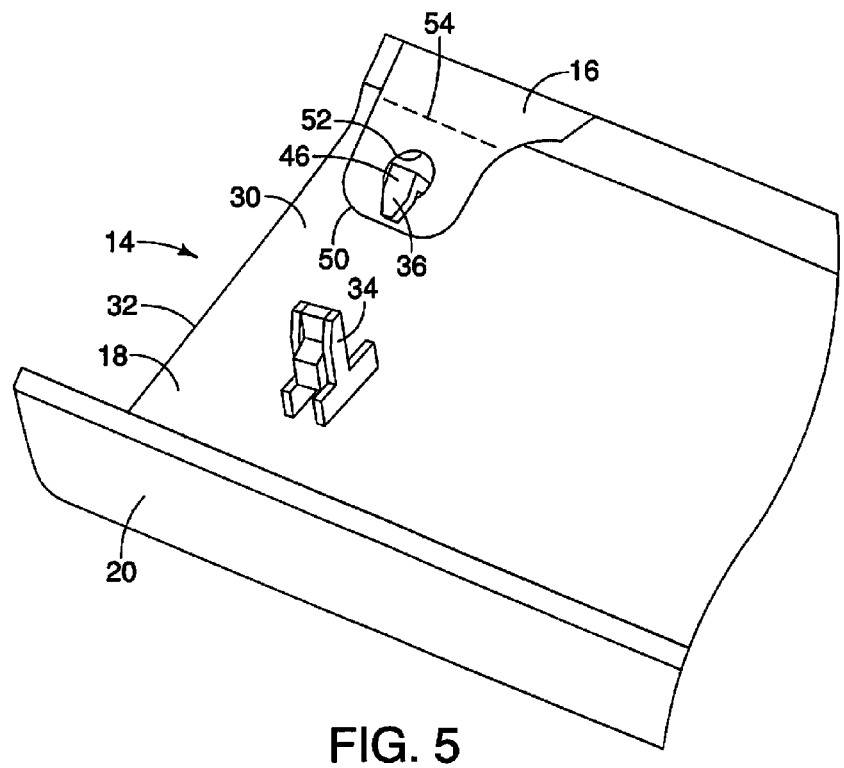
FIG. 5 is a perspective view of a portion of the trim panel showing one of the retention hooks formed on the attachment surface of the trim panel with a tab of the temporary cover attached thereto, the tab having a perforation in accordance with the first embodiment.
Figure 6:
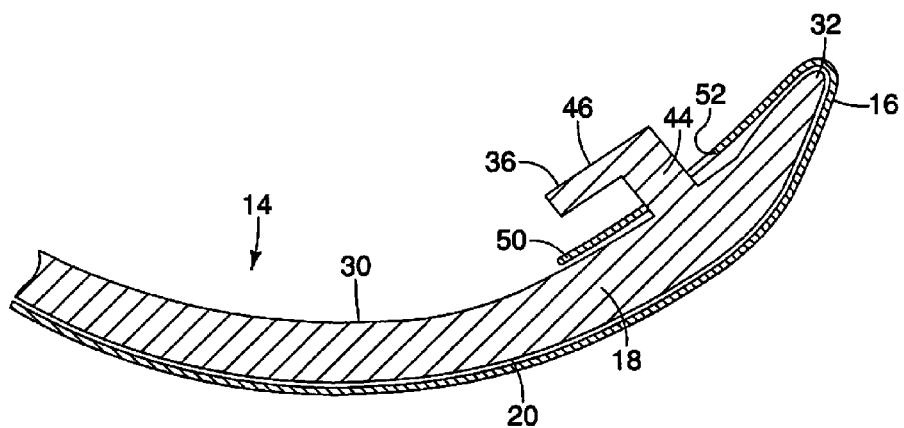
FIG. 6 is a cross-sectional view of a portion of the trim panel showing the temporary cover attached to the temporary hook in accordance with the first embodiment.
Figure 11:
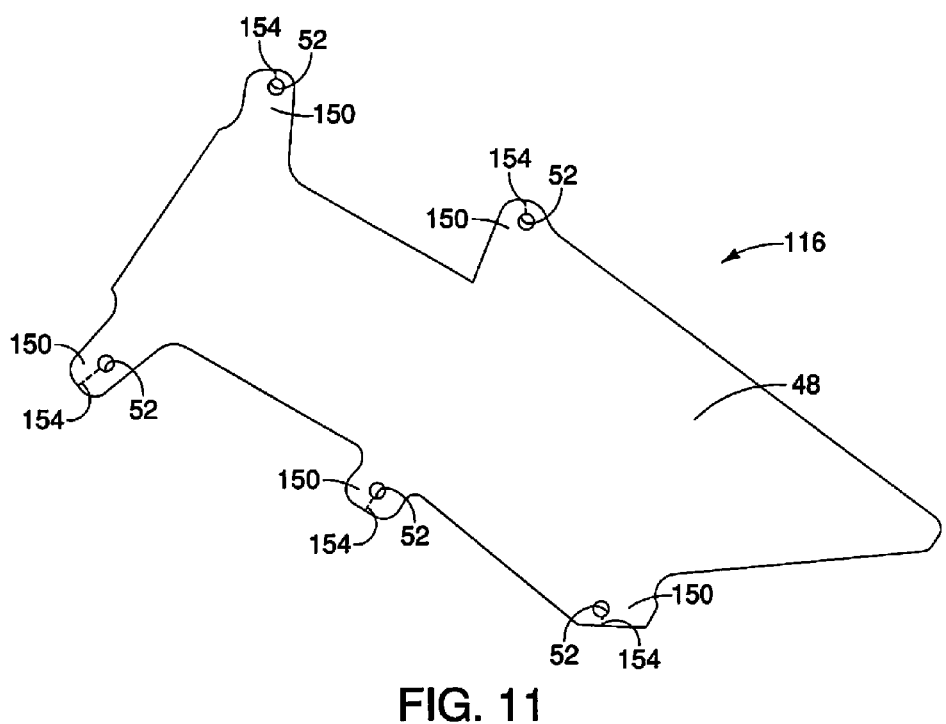
FIG. 11 is a plan view of a temporary cover shown removed from the trim panel, the temporary cover having tabs with a plurality of perforations that extend from respective ones of attachment apertures to edges of the tabs in accordance with the second embodiment.

As shown in FIGS. 5 and 6, each of the plurality of retention hooks 36 is basically a projection that protrudes or extends from the attachment surface 30. As shown in FIG. 6, each of the retention hooks 36 includes a base portion 44 and a hook portion 46. The base portion 44 extends from the attachment surface 30 to the hook portion 46. The hook portion 46 extends from the base portion 44 in a direction that is parallel to an adjacent section of the attachment surface 30. The hook portion 46 also extends from the base portion 44 toward a central section of the main body 18. Further, as shown in FIG. 6, the hook portion 44 and the hook portion 46 define an L-shape in cross-section. As is also shown in FIG. 6, the hook portion 46 extends from the base portion 44 in a direction away from an adjacent section of the peripheral edge 32 of the main body 18. More specifically, the hook portion 46 also extends from the base portion 44 in a direction that is perpendicular to an adjacent section of the peripheral edge 32.

The main body 18, the attachment projections 34 and the retention hooks 36 of the trim panel 14 are all formed as a single monolithic element. For example, the main body 18, the attachment projections 34 and the retention hooks 36 of the trim panel 14 can be made of a molded material. As mentioned above, the trim panel 14 can further include a decorative layer that defines the finished surface 20, and hence, can alternatively be a separate element added to cover the main body 18. If the trim panel 14 does include a decorative layer that defines the finished surface 20, the temporary cover 16 covers the decorative layer (the finished surface 20).

A description of the temporary cover 16 is now provided with specific reference to FIG. 3. The temporary cover 16 is preferably made of a thin flexible sheet or layer of a plastic or polymer material. The temporary cover 16 can also include multiple layers that are very thin. The temporary cover 16 can also be transparent so that details of the finished surface 20 of the trim panel 14 are easily recognizable. The temporary cover 16 is meant to be removable from the trim panel 14, but is sufficiently strong to withstand contact with foreign objects in order to protect the finished surface 20 of the trim panel 14. The temporary cover 16 includes a main section 48 and a plurality of tabs 50 that are spaced about an outer periphery of the main section 48. The main section 48 is sized such that it can completely cover the finished surface 20 and wrap around all portions of the peripheral edge 32 of the trim panel 14. The tabs 50 are shaped and dimensioned such that they can remain hidden along the attachment surface 30 with the temporary cover 16 installed to cover the finished surface 20 of the trim panel 14. Hence, with the main section 48 of the temporary cover 16 covering the finished surface 20 and wrapping about the peripheral edge of the temporary cover 16, the tabs 50 can hook onto the hook portions 46, as shown in FIGS. 5 and 6.

Each tab 50 includes an aperture 52 and a perforation 54. The tabs 50 are positioned such that with the main section 48 of the temporary cover 16 covering the finished surface 20 of the trim panel 14, the tabs 50 extend along a portion of the attachment surface 30. The apertures 52 of the tabs 50 are positioned to approximately align with a corresponding one of the hook portions 46, such that each of the hook portions 46 is inserted into a corresponding one of the apertures 52, as shown in FIG. 6.

In the first embodiment, each of the perforations 54 is located adjacent to a corresponding one of the apertures 52, but is spaced apart from the aperture 52. As shown in FIG. 7, the perforations 54 are provided so that the tabs 50 tear away from the main section 48 of the temporary cover 16 when the temporary cover 16 is removed from the trim panel 14. In other words, as the temporary cover 16 is pulled away from the finished surface 20 of the trim panel 14, the perforations 54 define a weakened portion of the temporary cover 16. Hence, when the temporary cover 16 is pulled away from the trim panel 14, the perforations 54 tear and the tabs 50 remain attached to the hook portions 46. The perforations 54 are formed at locations of the temporary cover 16 such that the tabs 50 remain entirely hidden along the attachment surface 30 and are not visible from the finished surface 20 of the trim panel 14, with the trim panel 14 installed within the vehicle 12.

Hence, when the temporary cover 16 is removed from the trim panel 14, all visible portions of the temporary cover 16 are easily removed, leaving no visible traces of the temporary cover 16. The tabs 50 remain attached to the retention hooks 36, but are hidden along the attachment surface 30 of the trim panel 14.

Second Embodiment

Referring now to FIGS. 8-13, a trim panel 114 and a temporary cover 116 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the trim panel 114 is basically identical to the trim panel 14 of the first embodiment, except that the retention hooks 36 have been replaced with retention hooks 136. The retention hooks 136 include a base portion 144 that extends from the attachment surface 30 of the trim panel 114 to a hook portion 146. The base portion 144 additionally includes a corner portion 144a. The corner portion 144a is an edge at the intersection of two surfaces of the base portion 144. The corner portion 144a extends between the adjacent section of the attachment surface 30 and the hook portion 14. The corner portion 144a faces a central section of the main body 18 of the trim panel 114. The corner portion 144a can be a straight intersection of surfaces or be slightly rounded as needed or desired.

Figure 12:
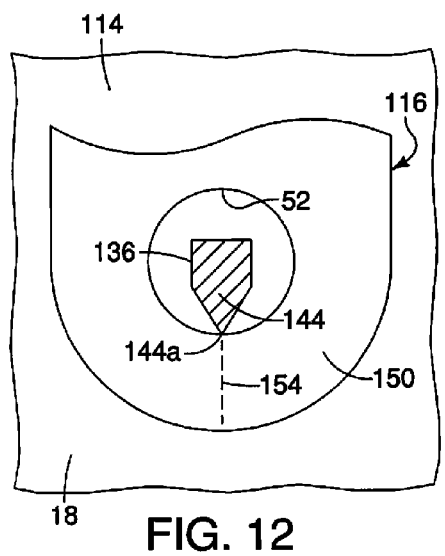
FIG. 12 is a cross-sectional view of the one of the retention hooks of the trim panel showing the edge of the retention hook approximately aligned with the perforation of the tab of the temporary cover in accordance with the second embodiment.
Figure 13:
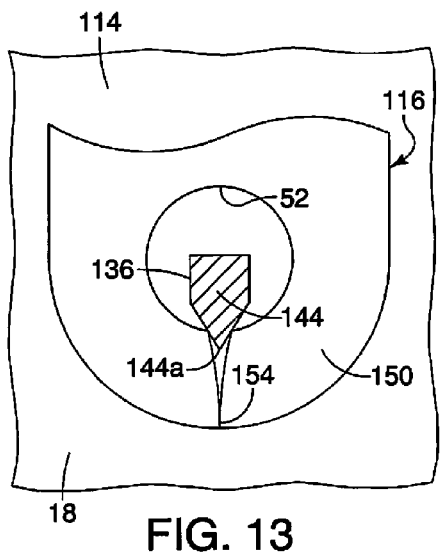
FIG. 13 is another cross-sectional view of the one of the retention hooks of the trim panel showing the edge of the retention hook tearing the tab of the temporary cover at the perforation in accordance with the second embodiment.

In the second embodiment, the temporary cover 116 is identical to the temporary cover 16 of the first embodiment, except that the perforations 54 of the first embodiment are replaced with perforations 154. In other words, the temporary cover 116 includes a plurality of tabs 150 that include perforations 154. Each one of the plurality of perforations 154 extends from a corresponding one of the plurality of apertures 52 to an edge of the temporary cover 116 adjacent to the corresponding one of the plurality of holes. Preferably, as shown in FIG. 12, with the tabs 150 installed to corresponding ones of the retention hooks 136, the perforations 154 approximately align with a corresponding one of the edges 144a. As indicated in FIG. 13, when a technician begins to remove the temporary cover 116 from the trim panel 114, the perforation 154 tears to release the temporary cover 116. Since the perforation 154 is aligned with or approximately aligned with the corner portion 144a, the corner portion 144a assists in achieving a clean tear along the perforation 154. Specifically, as the temporary cover 116 is pulled off of the trim panel 114, the tab 150 is put in tension with the corner portion 144a being forced into contact with the tab 150 proximate or at the perforation 154. Hence, the perforation 154 is forced to tear, releasing the tab 150 from the retention hook 136, and the temporary cover 116 is easily removed from the trim panel 114.

Third Embodiment

Referring now to FIGS. 14-16, a trim panel 214 and the temporary cover 116 in accordance with a third embodiment will now be explained. In view of the similarity between the second and third embodiments, the parts of the third embodiment that are identical to the parts of the second embodiment will be given the same reference numerals as the parts of the second embodiment. Moreover, the descriptions of the parts of the third embodiment that are identical to the parts of the first and second embodiments may be omitted for the sake of brevity.

In the third embodiment, the temporary cover 116 of the second embodiment is employed. However, in the third embodiment, the trim panel 214 is identical to the trim panel 114 of the second embodiment, except that the retention hooks 136 of the trim panel 114 of the second embodiment have been replaced with retention hooks 236. The retention hooks 236 include a base portion 224 and a hook portion 246. The base portion 224 includes a corner portion 224a that serves the same purpose as the corner portion 124a of the second embodiment. The hook portion 246 has an elongated pin shape. Further, the hook portion 246 extends from opposing sides of the base portion 244 with the corner portion 224a extending from the base portion 244 in directions parallel to an adjacent section of a peripheral edge 232 of the trim panel 214, as shown in FIG. 14. As shown in FIG. 16, the hook portion 246 and the base portion 244 define a T-shape in cross-section.

Fourth Embodiment

Figure 17:
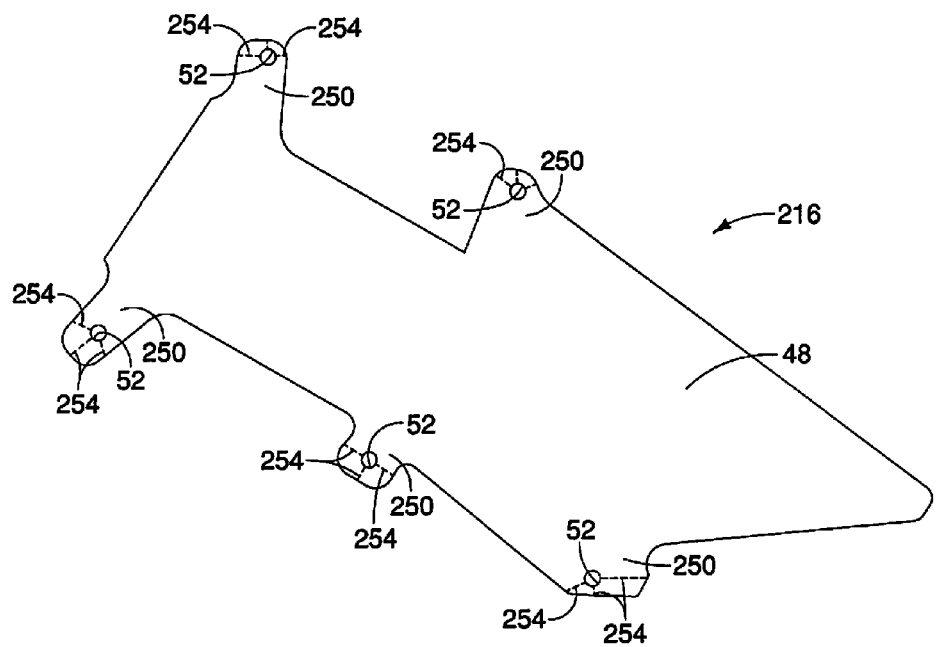
FIG. 17 is a plan view of a temporary cover shown removed from the trim panel, the temporary cover having tabs with a plurality of perforations that extend from respective ones of attachment apertures to edges of the tabs in accordance with a fourth embodiment.

Referring now to FIG. 17, a temporary cover 216 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The temporary cover 216 has some of the features of the temporary cover 16 of the first embodiment, including a main body 48. However, the tabs 50 of the first embodiment of the temporary cover 16 have been modified in the fourth embodiment. Specifically, tabs 250 in the fourth embodiment of the temporary cover 216 include multiple perforations 254 that extend from the aperture 52 to an adjacent edge of the tab 250. These multiple perforations 254 help to ensure easy release of the temporary cover 216.

Fifth Embodiment

Figure 18:
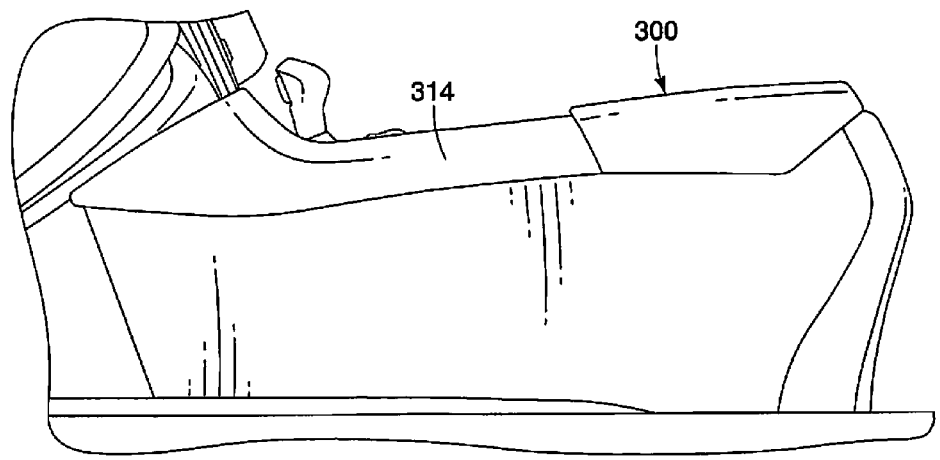
FIG. 18 is a side view of a center console of a vehicle having a trim panel in accordance with a fifth embodiment.
Figure 19:
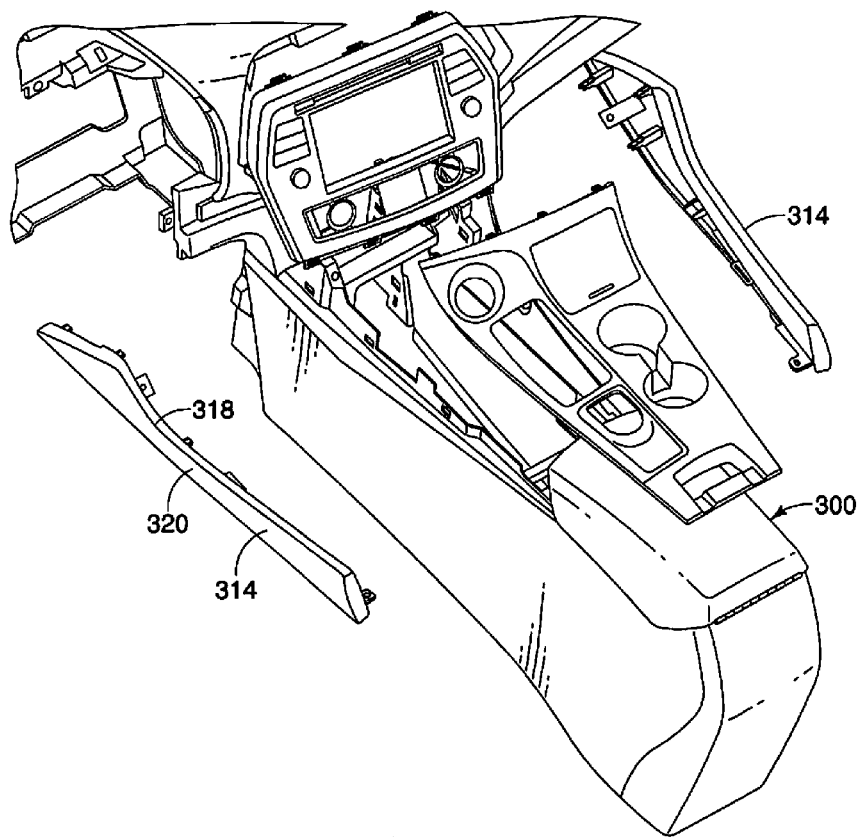
FIG. 19 is an exploded perspective view of the center console showing the trim panel with a temporary cover in accordance with the fifth embodiment.
Figure 20:
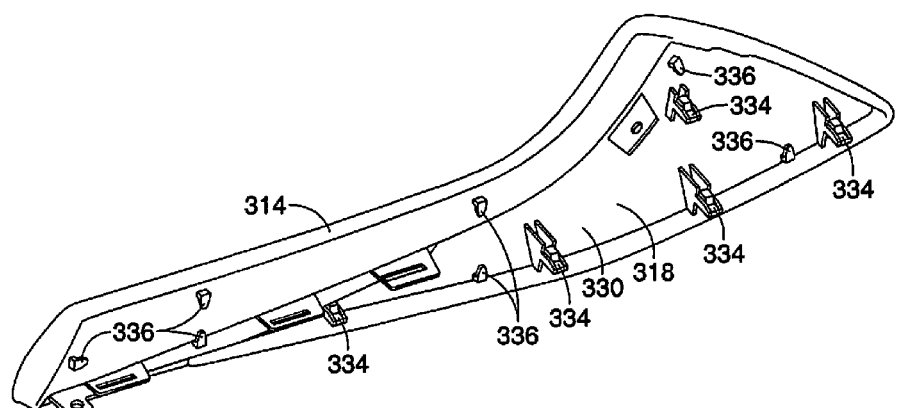
FIG. 20 is a perspective view of the trim panel showing an attachment surface thereof with attachment projections and a plurality of retention hooks in accordance with the fifth embodiment.

Referring now to FIGS. 18-20, a center console assembly 300 having a trim panel 314 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

As shown in FIG. 19, the center console assembly 300 can include a pair of the trim panels 314. Only one of the trim panels 314 is described herein, but this description applies equally to both of the trim panels 314.

As shown in FIG. 19, the trim panel 314 includes a main body 318 that has a finished surface 320 that can be covered by any one of the above described temporary covers 16, 116 or 216. As shown in FIG. 20, the main body 318 of the trim panel 314 also includes an attachment surface 330. The attachment surface 330 includes a plurality of attachment projections 334 and a plurality of retention hooks 336. In the depicted embodiment, the attachment projections 334 are snap-fitting projections that attach the trim panel 314 to the center console assembly 300. The retention hooks 336 are provided to attach and secure the temporary cover 16, 116 or 216 to the trim panel 314 in a manner described above with respect to the first embodiment. The retention hooks 336 have basically the same structure as the retention hooks 36 in the first embodiment. Therefore, further description will be omitted for the sake of brevity.

The fifth embodiment demonstrates that retention hooks 36, 136 and 236 of the trim panels 14, 114 and 214 of the first, second and third embodiments can be employed on any of a variety of trim panel shapes and sized.

The various features of the vehicle and passenger compartment mentioned above (other than the trim panels and the temporary covers) are conventional components that are well known in the art. Since the various features of the vehicle and passenger compartment are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle trim panel. Accordingly, these terms, as utilized to describe the present invention should be interpreted relative to a vehicle equipped with the vehicle trim panel.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle trim panel, comprising:
    a main body having a finished surface and an attachment surface with a peripheral edge that encircles the main body and is defined between the finished surface and the attachment surface,
    the attachment surface including a plurality of attachment projections that protrude from the attachment surface, the plurality of attachment projections being dimensioned and positioned to fixedly attach the main body to a vehicle body member,
    the attachment surface also including a plurality of retention hooks protruding from the attachment surface; and
    a temporary cover covering the finished surface and including a plurality of holes fitted to corresponding ones of the plurality of retention hooks.

2. The vehicle trim panel according to claim 1, wherein at least a portion of the plurality of attachment projections is snap-fitting projections.

3. The vehicle trim panel according to claim 1, wherein each of the plurality of retention hooks includes a base portion and a hook portion, the base portion extending from the attachment surface to the hook portion and the hook portion extending from the base portion in a direction that is parallel to an adjacent section of the attachment surface.

4. The vehicle trim panel according to claim 3, wherein the hook portion and the base portion define an L-shape in cross-section.

5. The vehicle trim panel according to claim 3, wherein the hook portion extends from the base portion in a direction away from an adjacent section of the peripheral edge of the main body.

6. The vehicle trim panel according to claim 3, wherein the hook portion and the base portion define a T-shape in cross-section.

7. The vehicle trim panel according to claim 6, wherein the hook portion extends from the base portion in directions parallel to an adjacent section of the peripheral edge of the main body.

8. The vehicle trim panel according to claim 3, wherein the base portion includes a corner portion that extends between the adjacent section of the attachment surface and the hook portion, the corner portion facing a central section of the main body.

9. The vehicle trim panel according to claim 8, wherein
the temporary cover includes a plurality of perforations,
- each one of the plurality of perforations extending from a corresponding one of the plurality of holes to an edge of the temporary cover adjacent to the corresponding one of the plurality of holes, and
- at least one of the plurality of perforations is situated about a periphery of a corresponding one of the plurality of holes such that the at least one perforation contacts a corner of a base portion of a corresponding one of the plurality of retention hooks.

10. The vehicle trim panel according to claim 1, wherein the temporary cover includes a main section and a plurality of tabs extending from the main section, the main section completely covering the finished surface of the main body and each one of the plurality of holes being formed in a corresponding one of the plurality of tabs.

11. The vehicle trim panel according to claim 9, wherein each of the plurality of tabs includes a perforation adjacent to corresponding ones of the plurality of holes.

12. The vehicle trim panel according to claim 1, wherein the temporary cover includes a plurality of perforations, each one of the plurality of perforations being located adjacent to a corresponding one of the plurality of holes.

13. The vehicle trim panel according to claim 1, wherein the temporary cover includes a plurality of perforations, each one of the plurality of perforations extending from a corresponding one of the plurality of holes to an edge of the temporary cover adjacent to the corresponding one of the plurality of holes.

14. A vehicle trim panel, comprising:
- a main body having a finished surface and an attachment surface with a peripheral edge that encircles the main body and is defined between the finished surface and the attachment surface,
- the attachment surface including a plurality of attachment projections that protrude from the attachment surface, the plurality of attachment projections being dimensioned and positioned to fixedly attach the main body to a vehicle body member, and
- the attachment surface also including a plurality of retention hooks protruding from the attachment surface at locations adjacent to respective sections of the peripheral edge of the main body, each of the plurality of retention hooks includes a base portion and a hook portion, the base portion extending from the attachment surface to the hook portion, the hook portion being spaced apart from the main body and extending from the base portion toward a central section of the main body.

15. The vehicle trim panel according to claim 13, wherein the hook portion and the base portion define an L-shape in cross-section.

16. The vehicle trim panel according to claim 14, wherein the hook portion extends from the base portion in a direction that is perpendicular to an adjacent section of the peripheral edge.

17. The vehicle trim panel according to claim 14, wherein the base portion includes a corner portion that extends between the adjacent section of the attachment surface and the hook portion, the corner portion facing a central section of the main body.

18. A vehicle trim panel, comprising:
- a main body having a finished surface and an attachment surface with a peripheral edge that encircles the main body and is defined between the finished surface and the attachment surface,
- the attachment surface including a plurality of attachment projections that protrude from the attachment surface, the plurality of attachment projections being dimensioned and positioned to fixedly attach the main body to a vehicle body member, and
- the attachment surface also including a plurality of retention hooks protruding from the attachment surface at locations adjacent to respective sections of the peripheral edge of the main body, each of the plurality of retention hooks includes a base portion and a hook portion, the base portion extending from the attachment surface to the hook portion, the hook portion being spaced apart from the main body and extending from the base portion in a direction parallel to an adjacent section of the peripheral edge of the main body.

19. The vehicle trim panel according to claim 18, wherein the hook portion and the base portion define a T-shape in cross-section.

20. The vehicle trim panel according to claim 18, wherein the base portion includes a corner portion that extends between the adjacent section of the attachment surface and the hook portion, the corner portion facing a central section of the main body.

* * * * *